(12) United States Patent
Amjad et al.

(10) Patent No.: US 10,133,044 B2
(45) Date of Patent: Nov. 20, 2018

(54) MULTI-UNIT SPACE-EFFICIENT LIGHT-CONCENTRATING LENS ASSEMBLY

(71) Applicant: 1930106 Ontario Limited, Sudbury (CA)

(72) Inventors: Malik Amjad, Redmond, WA (US); James Delsaut, Sudbury (CA); Gilles Leduc, Sudbury (CA); Kelsey Leduc, Sudbury (CA)

(73) Assignee: 1930106 Ontario Limited, Ontario (CA)

( * ) Notice: Subject to any disclaimer, the term of this patent is extended or adjusted under 35 U.S.C. 154(b) by 164 days.

(21) Appl. No.: 15/314,900

(22) PCT Filed: May 28, 2015

(86) PCT No.: PCT/CA2015/050486
§ 371 (c)(1),
(2) Date: Nov. 29, 2016

(87) PCT Pub. No.: WO2015/179981
PCT Pub. Date: Dec. 3, 2015

(65) Prior Publication Data
US 2017/0108681 A1  Apr. 20, 2017

Related U.S. Application Data

(60) Provisional application No. 62/004,537, filed on May 29, 2014.

(51) Int. Cl.
*G02B 19/00* (2006.01)
*F24S 23/79* (2018.01)
(Continued)

(52) U.S. Cl.
CPC .......... *G02B 19/0023* (2013.01); *F24S 23/79* (2018.05); *F24S 23/80* (2018.05);
(Continued)

(58) Field of Classification Search
None
See application file for complete search history.

(56) References Cited

U.S. PATENT DOCUMENTS 3,923,381 A 12/1975 Winston
4,002,499 A 1/1977 Winston
(Continued)

FOREIGN PATENT DOCUMENTS

WO WO-2015179981 12/2015

OTHER PUBLICATIONS

"International Application No. PCT/CA/2015/050486, International Search Report and Written Opinion dated Jul. 24, 2015", (Jul. 24, 2015), 8 pgs.
(Continued)

*Primary Examiner* — Derek S Chapel
(74) *Attorney, Agent, or Firm* — Schwegman Lundberg & Woessner, P.A.

(57) ABSTRACT

A light-concentrating lens assembly for a solar energy system, the assembly comprising a primary off-axis quarter-section parabolic reflector for reflecting incident light, a secondary off-axis quarter-section parabolic reflector for receiving light reflected from the primary off-axis quarter-section parabolic reflector, a compound paraboloid concentrator (CPC) for receiving light reflected from the secondary off-axis quarter-section parabolic reflector and a housing for holding the primary and secondary off-axis parabolic reflectors as well as the CPC.

20 Claims, 24 Drawing Sheets

(51) Int. Cl.
*H02S 40/22* (2014.01)
*F24S 23/70* (2018.01)
(52) U.S. Cl.
CPC .......... *G02B 19/0042* (2013.01); *H02S 40/22* (2014.12); *F24S 2023/83* (2018.05); *F24S 2023/874* (2018.05)

(56) References Cited

U.S. PATENT DOCUMENTS

| | | |
|---|---|---|
| 4,003,638 A | 1/1977 | Winston |
| 5,296,044 A | 3/1994 | Harvey et al. |
| 5,964,216 A | 10/1999 | Hoffschmidt et al. |
| 2008/0223431 A1 | 9/2008 | Chu |
| 2010/0307586 A1* | 12/2010 | Benitez .............. G02B 19/0042 136/259 |
| 2011/0083718 A1 | 4/2011 | Wichner |
| 2011/0162690 A1 | 7/2011 | Workman et al. |
| 2013/0153519 A1 | 6/2013 | Ashmore et al. |
| 2015/0055237 A1* | 2/2015 | Chan ..................... F24J 2/1047 359/853 |

OTHER PUBLICATIONS

Rabl, Ari, "Comparison of Solar Concentrators", Solar Energy, vol. 18, pp. 93-111 (1976), (Dec. 10, 1975), 93-111.

* cited by examiner

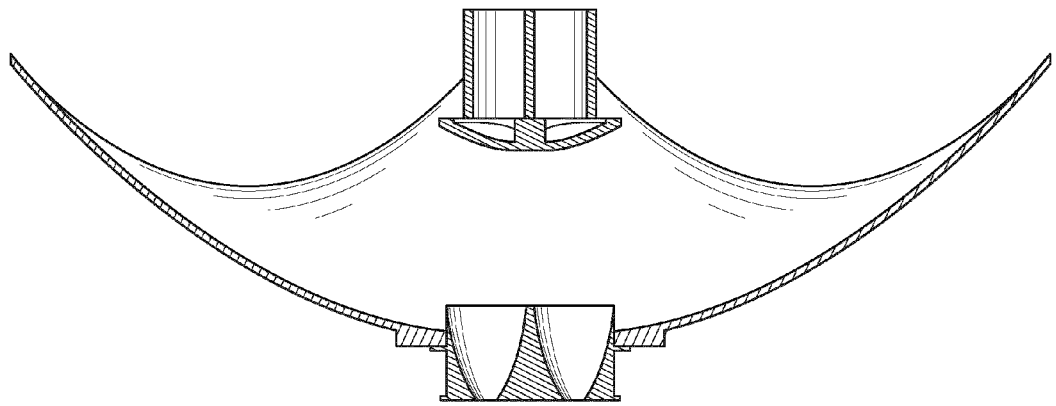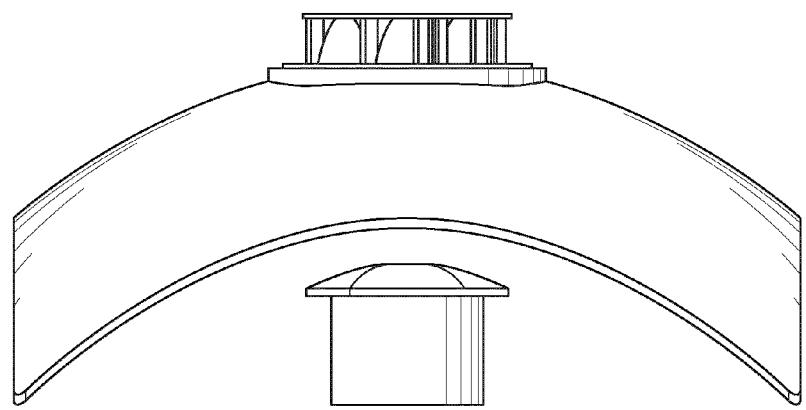
FIG. 10

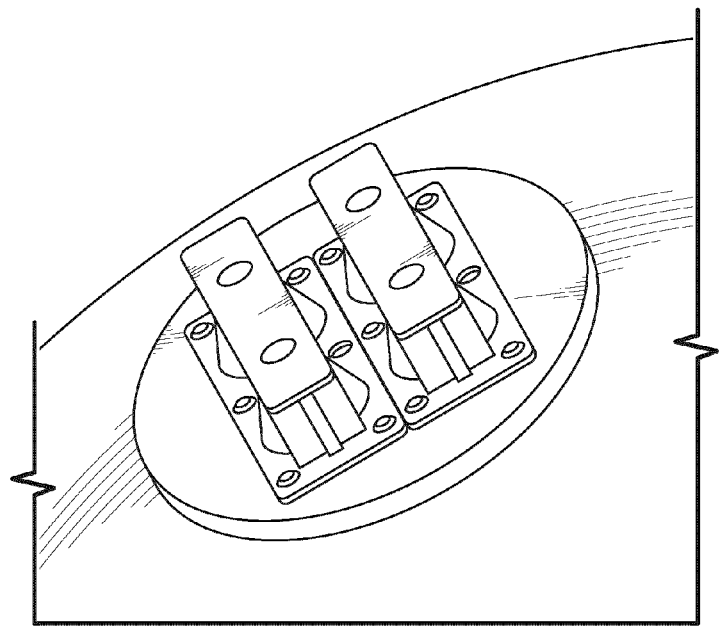
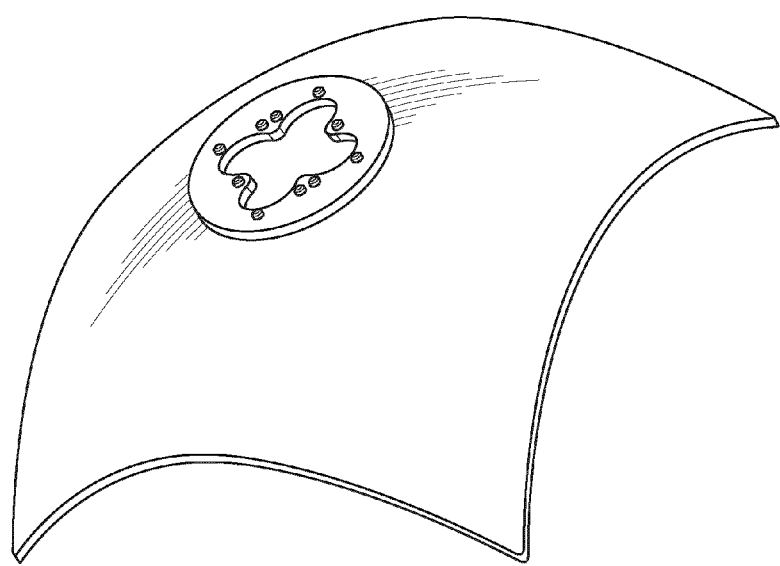
FIG. 11

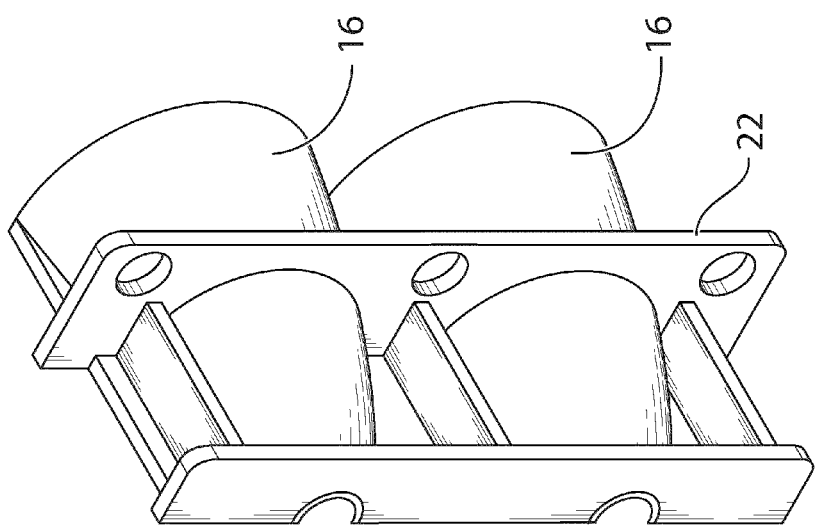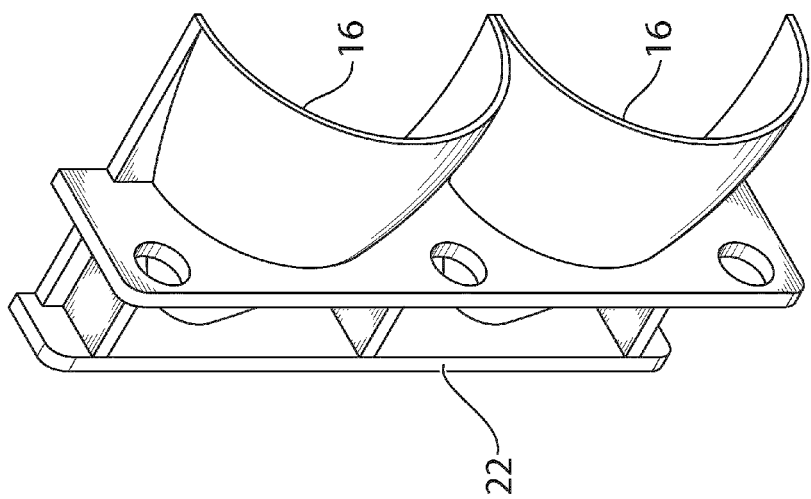
FIG. 12

MULTI-UNIT SPACE-EFFICIENT LIGHT-CONCENTRATING LENS ASSEMBLY

PRIORITY CLAIM TO RELATED APPLICATIONS

This application is a U.S. national stage application filed under 35 U.S.C. § 371 from International Application Serial No. PCT/CA2015/050486, which was filed 28 May 2015, and published as WO2015/179981 on 3 Dec. 2015, and which claims priority to U.S. Provisional Application No. 62/004,537, filed 29 May 2014, which applications and publication are incorporated by reference as if reproduced herein and made a part hereof in their entirety, and the benefit of priority of each of which is claimed herein.

TECHNICAL FIELD

The present technology relates generally to solar energy and, in particular, to lenses and concentrators for solar energy systems.

BACKGROUND

Solar concentrators are devices that augment the efficiency of solar power by concentrating sun rays using parabolic mirrors or a fresnel lens. A good review of solar concentrators is presented by Ari Rabl in "Comparison of Solar Concentrators", *Solar Energy*, Vol. 18, pp. 93-111.

With the increasing importance of solar energy, further improvements and enhancements in solar concentrator technology remain highly desirable. In particular, a design that enables the lens assemblies to be packaged in a more space-efficient arrangement would be highly desirable.

SUMMARY

In general, a light-concentrating lens assembly that acts as a solar concentrator has a primary off-axis parabolic reflector, a secondary off-axis parabolic reflector and a compound paraboloid concentrator (CPC). The off-axis reflectors are quarter-section reflectors that enable space-efficient packaging.

An inventive aspect of the disclosure is a light-concentrating lens assembly for a solar energy system, the assembly comprising a primary off-axis quarter-section parabolic reflector for reflecting incident light, a secondary off-axis quarter-section parabolic reflector for receiving light reflected from the primary off-axis quarter-section parabolic reflector, a compound paraboloid concentrator (CPC) for receiving light reflected from the secondary off-axis quarter-section parabolic reflector and a housing for holding the primary and secondary off-axis parabolic reflectors as well as the CPC.

Another inventive aspect of the disclosure is a multi-unit light-concentrating lens assembly for a solar energy system, the assembly comprising for each unit of a plurality of units packaged together: a primary off-axis quarter-section parabolic reflector for reflecting incident light, a secondary off-axis quarter-section parabolic reflector for receiving light reflected from the primary off-axis quarter-section parabolic reflector, a compound paraboloid concentrator (CPC) for receiving light reflected from the secondary off-axis quarter-section parabolic reflector, and a housing for holding the primary and secondary off-axis parabolic reflectors as well as the CPC. Four units are packaged together such that the primary and secondary off-axis quarter-section parabolic reflectors of each unit abut the primary and secondary off-axis quarter-section parabolic reflectors of two adjacent units.

Other aspects of the present invention are described below in relation to the accompanying drawings.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present technology will become apparent from the following detailed description, taken in combination with the appended drawings, in which:

FIG. 10 are side views of the quad-mirror unit;

FIG. 11 depicts the CPC mounting structure;

FIG. 12 depicts half of the CPC mounting structure;

It will be noted that throughout the appended drawings, like features are identified by like reference numerals.

DETAILED DESCRIPTION

FIGS. 1-24 depict a light-concentrating lens assembly and a multi-unit light-concentrating assembly for a solar energy system in accordance with an embodiment of the present invention. The light-concentrating lens assembly (or multi-unit assembly) may be used with any suitable solar energy system including a hybrid solar energy system.

Figure 1:
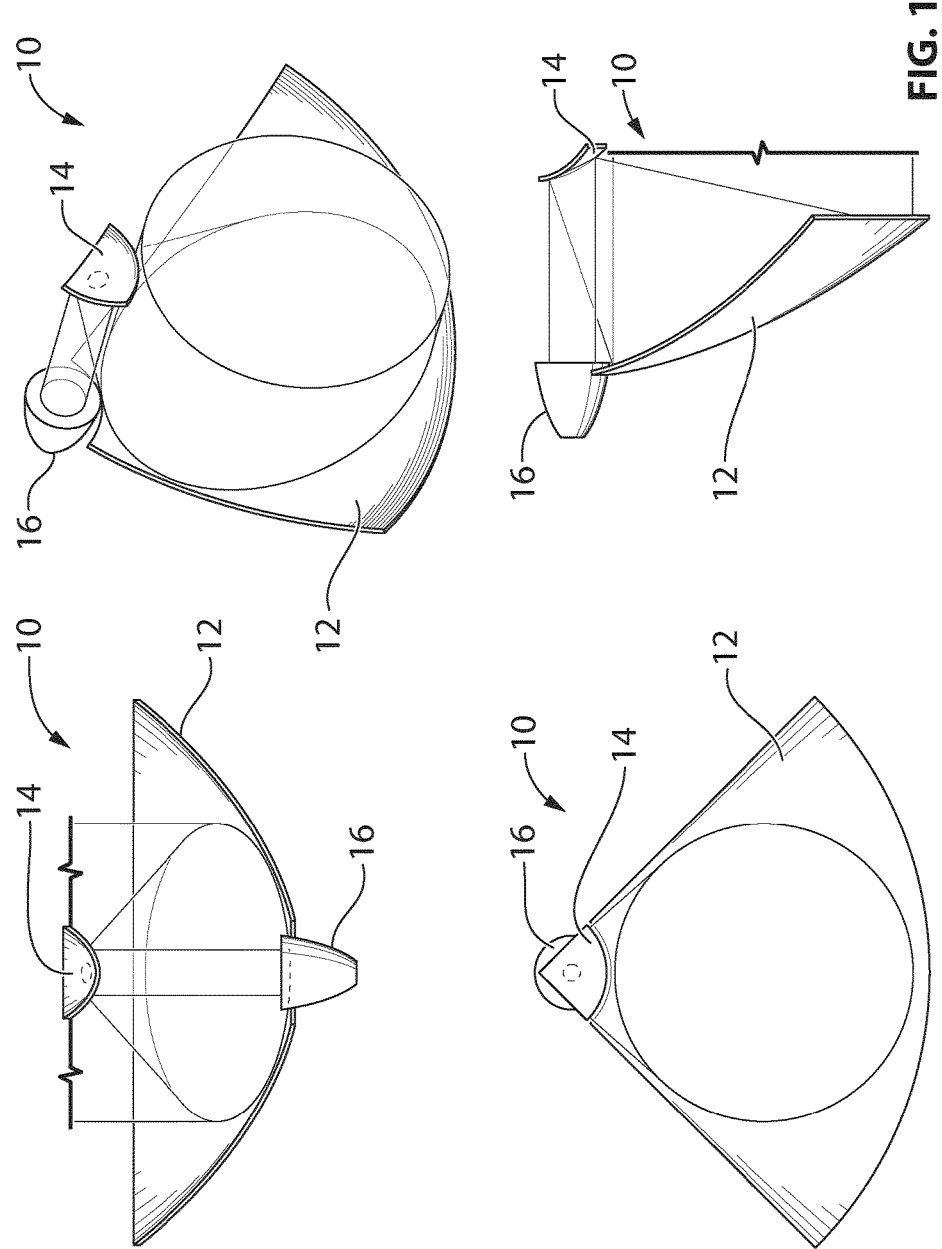
FIG. 1 depicts four views of a light-concentrating lens assembly in accordance with an embodiment of the present invention.

As depicted in FIG. 1, a light-concentrating lens assembly, which is generally designated by reference numeral 10, comprises a primary off-axis quarter-section parabolic reflector 12 for reflecting incident light, a secondary off-axis quarter-section parabolic reflector 14 for receiving light reflected from the primary off-axis quarter-section parabolic reflector, a non-imaging optical concentrator, e.g. a a compound paraboloid concentrator (CPC) 16 for receiving light reflected from the secondary off-axis quarter-section parabolic reflector and a housing for holding the primary and secondary off-axis parabolic reflectors as well as the CPC. The compound paraboloid concentrator (CPC) is also known as a Winston cone. The Winston cone is described and illustrated in U.S. Pat. No. 3,923,381, U.S. Pat. No. 4,003,638 and U.S. Pat. No. 4,002,499, which are all hereby incorporated by reference. The publication by Ari Rabl in "Comparison of Solar Concentrators", *Solar Energy*, Vol. 18, pp. 93-111 is also hereby incorporated by reference.

Figure 2:
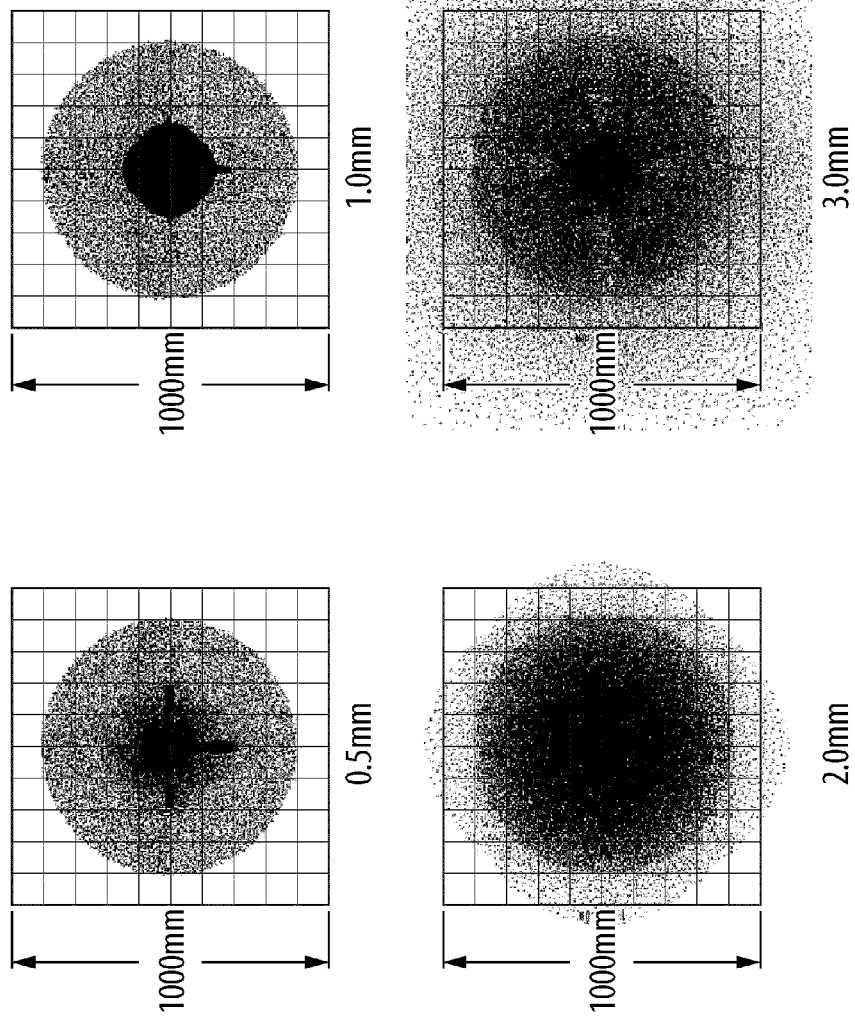
FIG. 2 depicts energy distribution graphs at various distances from the CPC exit for the light-concentrating lens assembly depicted in FIG. 1.

FIG. 2 depicts energy distributions at distances of 0.5 mm, 1.0 mm, 2.0 mm and 3.0 mm from an 8 mm CPC exit. These validate the geometry of the assembly as providing excellent solar concentration. Although in example presented in this figure, an 8 mm CPC exit aperture is demonstrated, a varied dimension of exit aperture (either larger or smaller) could be used to decrease or increase the concentration from the CPC (in Suns) respectively.

Figure 3:
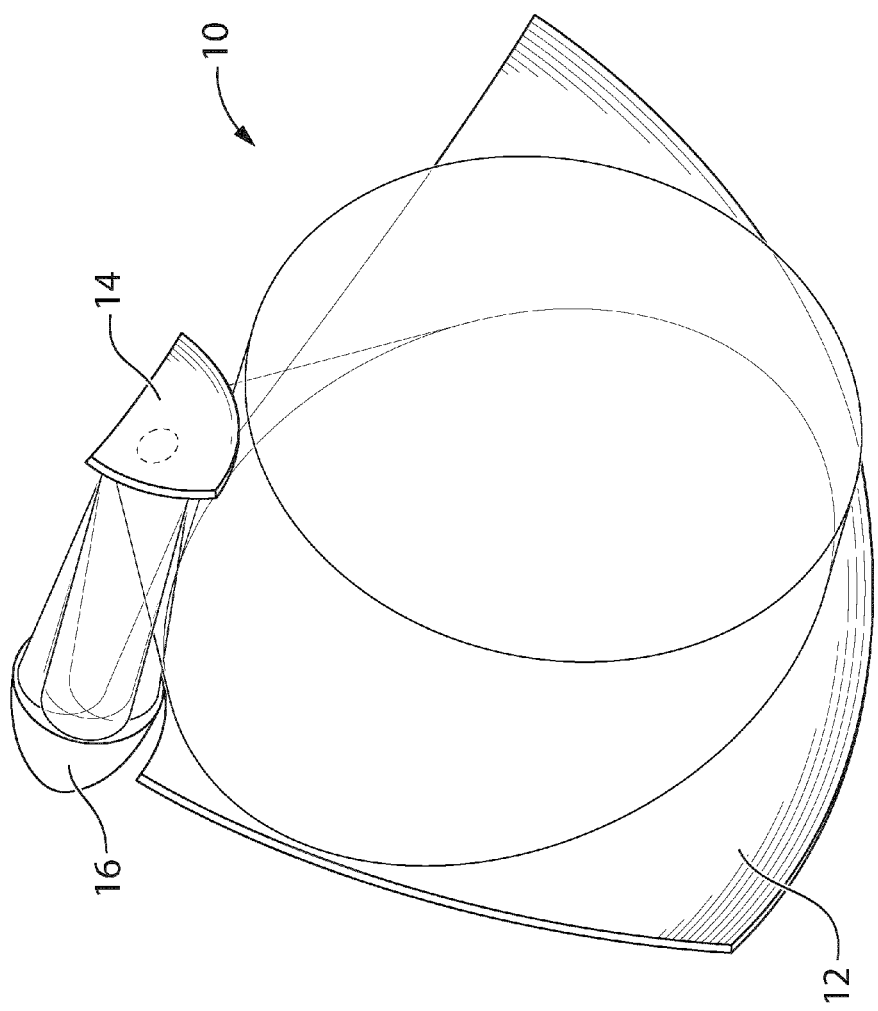
FIG. 3 is an isometric view of the light-concentrating lens assembly depicted in FIG. 1.

FIG. 3 is an isometric view of the assembly 10, again showing the primary off-axis quarter-section parabolic reflector 12, the secondary off-axis quarter-section parabolic reflector 14 and the compound paraboloid concentrator (CPC) 16. The primary off-axis quarter-section parabolic reflector is larger than the secondary off-axis quarter-section parabolic reflector.

Figure 4:
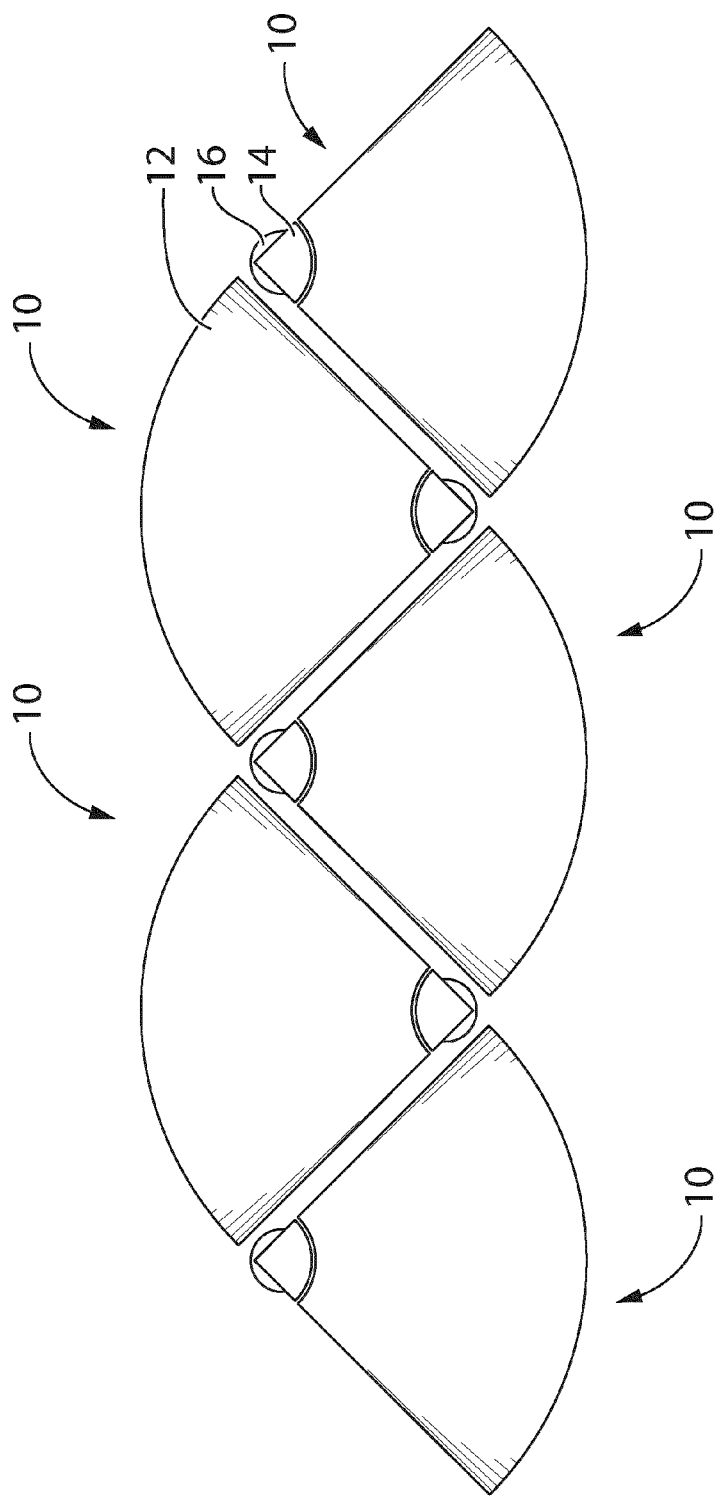
FIG. 4 depicts one embodiment of a multi-unit space-efficient light-concentrating lens assembly.

Because each reflector 12, 14 is a quarter-section of a parabola, these assemblies may be packaged as shown by way of example in FIG. 4. This quarter-section design is space-efficient. Each individual quarter-section assembly 10 is referred to herein as a unit in a multi-unit assembly. The geometry of the primary and secondary reflectors 12, 14 and CPC 16 permit tight space-efficient packaging.

Figure 5:
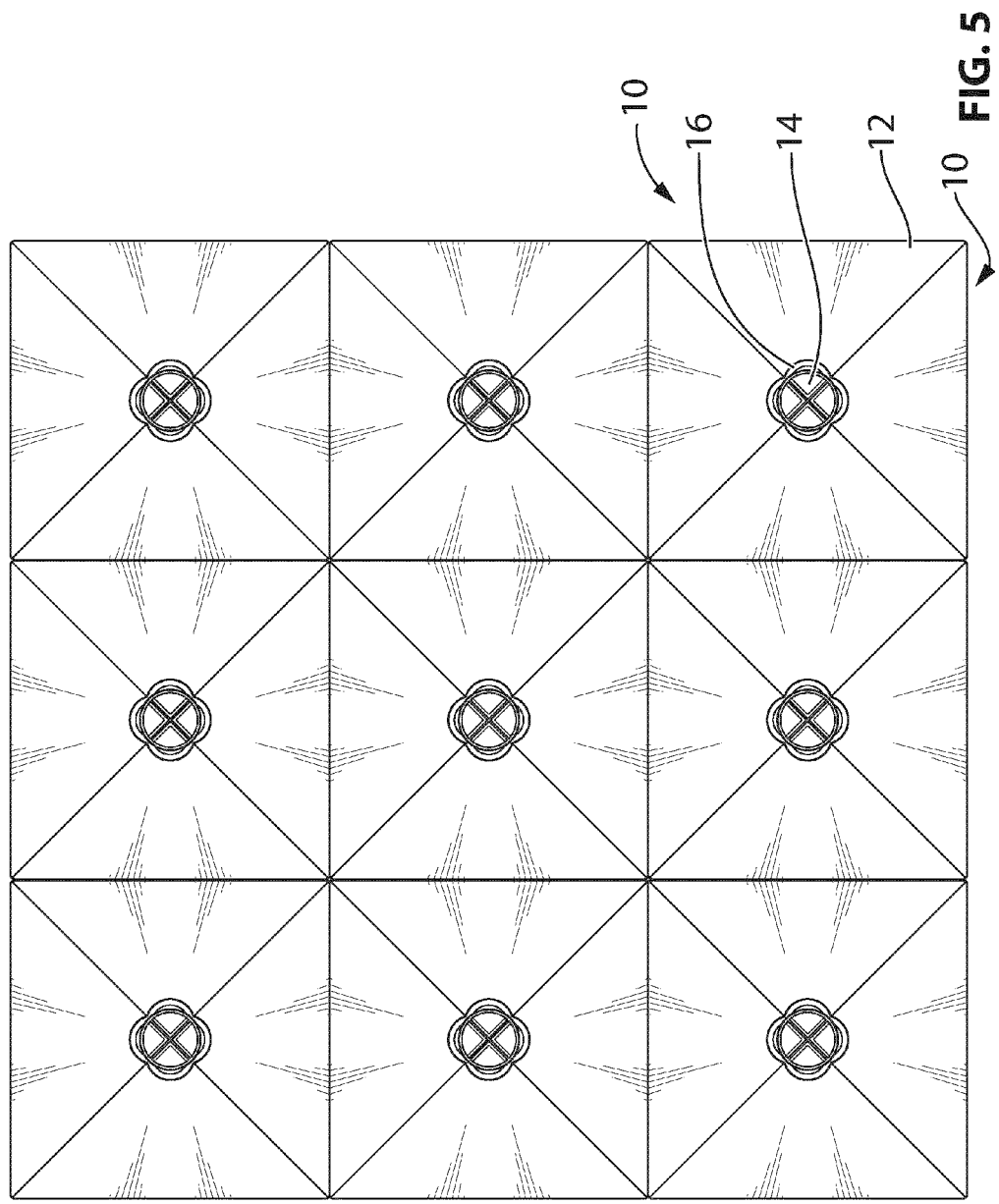
FIG. 5 depicts another embodiment of a multi-unit space-efficient light-concentrating lens assembly in which the reflectors are grouped into groups of four units.

Another space-efficient packaging arrangement of units 10 is depicted by way of example in FIG. 5. In this arrangement, four units 10 are grouped into a quad-type assembly ("quads") as shown. There are nine quads in the exemplary 3×3 array depicted in FIG. 5 for a total of 36 quarter-section assemblies or units. This is merely one illustrative arrangement of the multi-unit assembly. In each quarter-section assembly 10 there is the primary reflector 12 having a quarter parabolic shape and the secondary reflector 14 also having a quarter parabolic shape (as well as the CPC 16).

Figure 6:
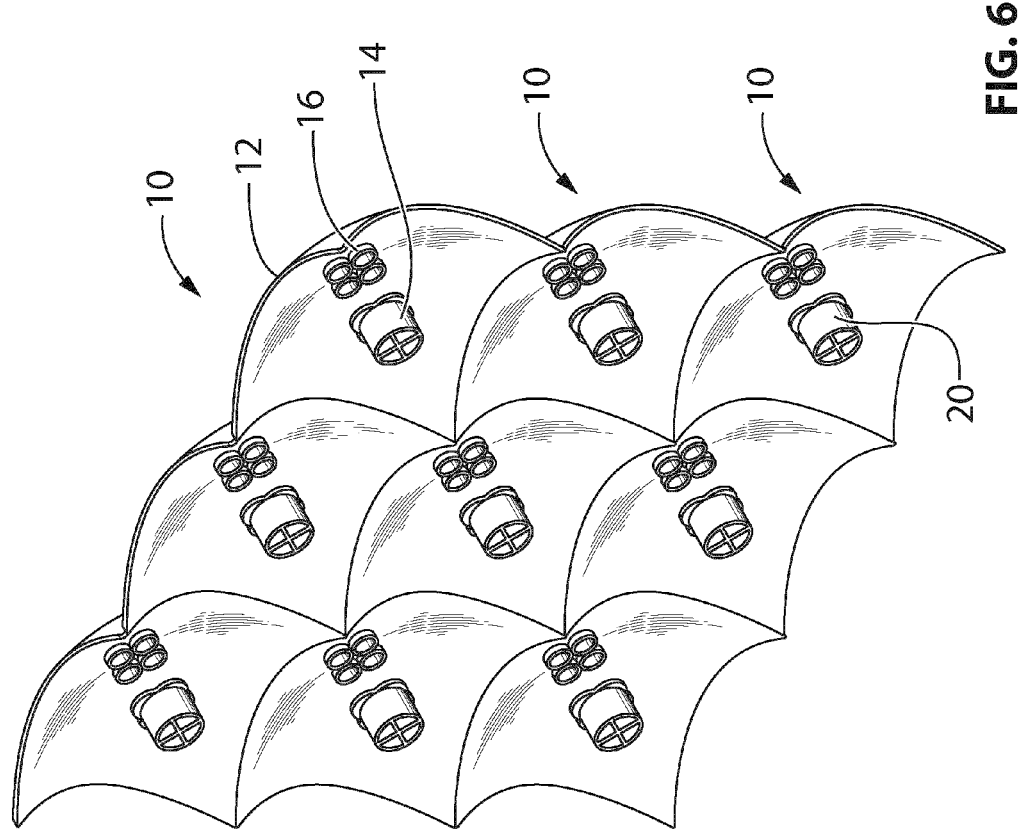
FIG. 6 is an isometric view of the multi-unit space-efficient light-concentrating lens assembly of FIG. 5.

FIG. 6 is an isometric view of the multi-unit space-efficient light-concentrating lens assembly of FIG. 5, showing a 3×3 array of nine quads composed of four quarter-section units 10. Each unit has primary and secondary quarter-section parabolic reflectors 12, 14 and a CPC.

Figure 7:
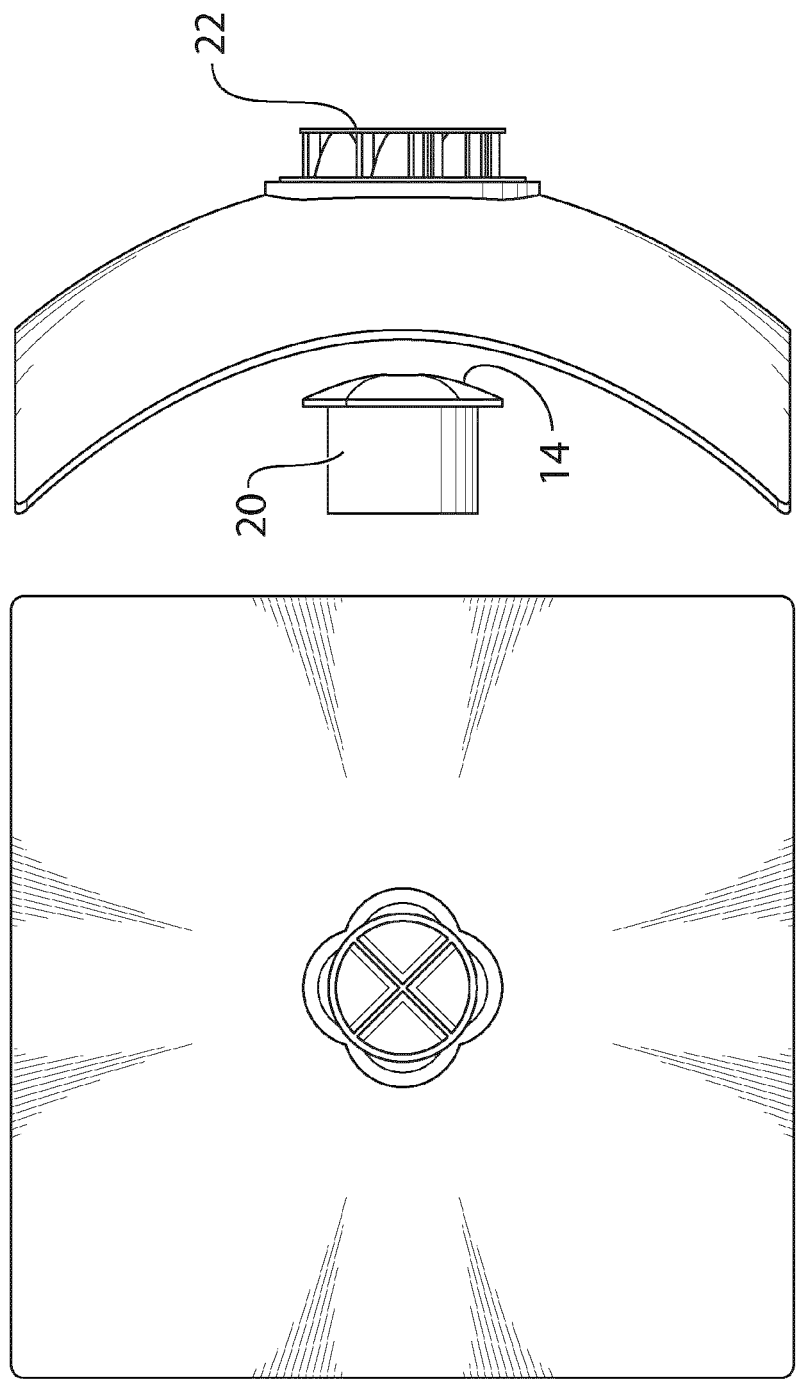
FIG. 7 depicts one quad-mirror unit.

FIG. 7 depicts one quad (or quad-mirror unit) that is composed of four quarter section parabolic reflectors. Shown in this figure is the secondary mirror support 20 for supporting four secondary reflectors 14 of a group of four adjacent units. It is envisaged that in other embodiments having different geometries it may not be necessary to provide the secondary mirror support. A CPC mounting bracket 22 (or mounting structure) is also shown in this figure. The bracket holds four CPC's.

Figure 8:
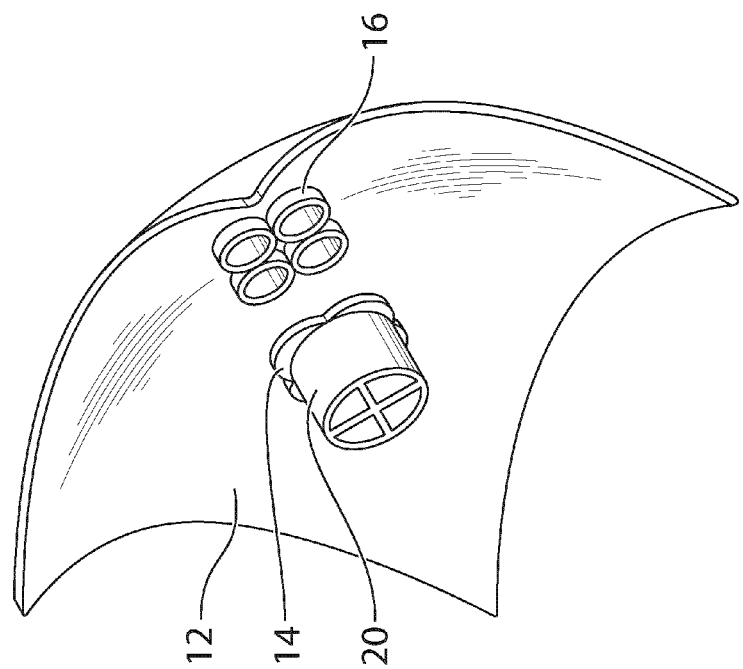
FIG. 8 is an isometric view of a quad-mirror unit.

FIG. 8 is an isometric view of the quad (or quad-mirror unit) of FIG. 7. The quad has a primary mirror (or reflector) 12 and a secondary mirror (or reflector) 14 (supported by the secondary mirror support 20) and four CPC's 16. The primary mirror defines four off-axis quarter-section parabolic reflectors. The secondary mirror also defines four off-axis quarter-section parabolic reflectors.

Figure 9:
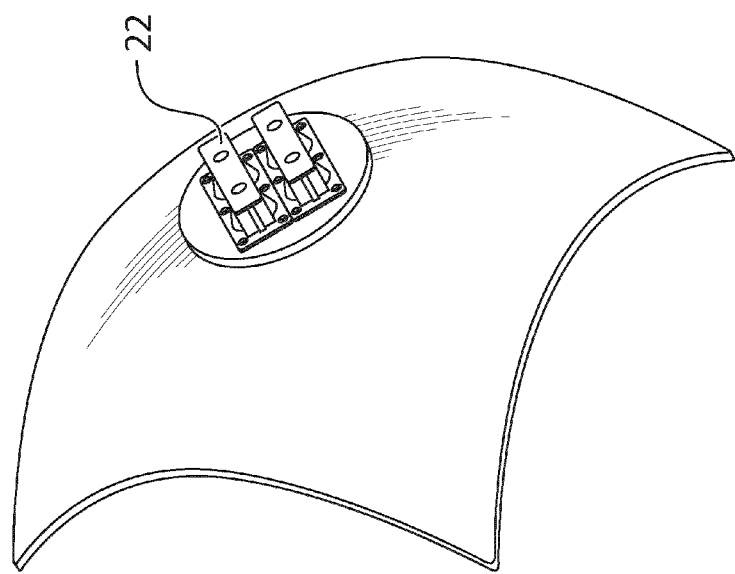
FIG. 9 is a rear isometric view of the quad-mirror unit.

FIG. 9 is a rear isometric view of the quad-mirror unit showing the CPC mounting bracket 22. In this embodiment, there may be two separate brackets for holding a pair of CPC's. Alternatively, one bracket may hold all four CPC's or four individual brackets may each hold a single CPC.

FIG. 10 are side views of the quad-mirror unit, again showing the CPC mounting bracket. Note that in this embodiment the secondary mirror support 20 is in line with the edges of the primary mirror as shown.

FIG. 11 depicts the CPC mounting structure (i.e. mounting bracket) and the four lobes of the central hole in the primary mirror. The bracket may be attached by fasteners or other suitable mechanical means.

FIG. 12 depicts half of the CPC mounting structure 22 holding a cutaway half of two CPC's 16.

Figure 13:
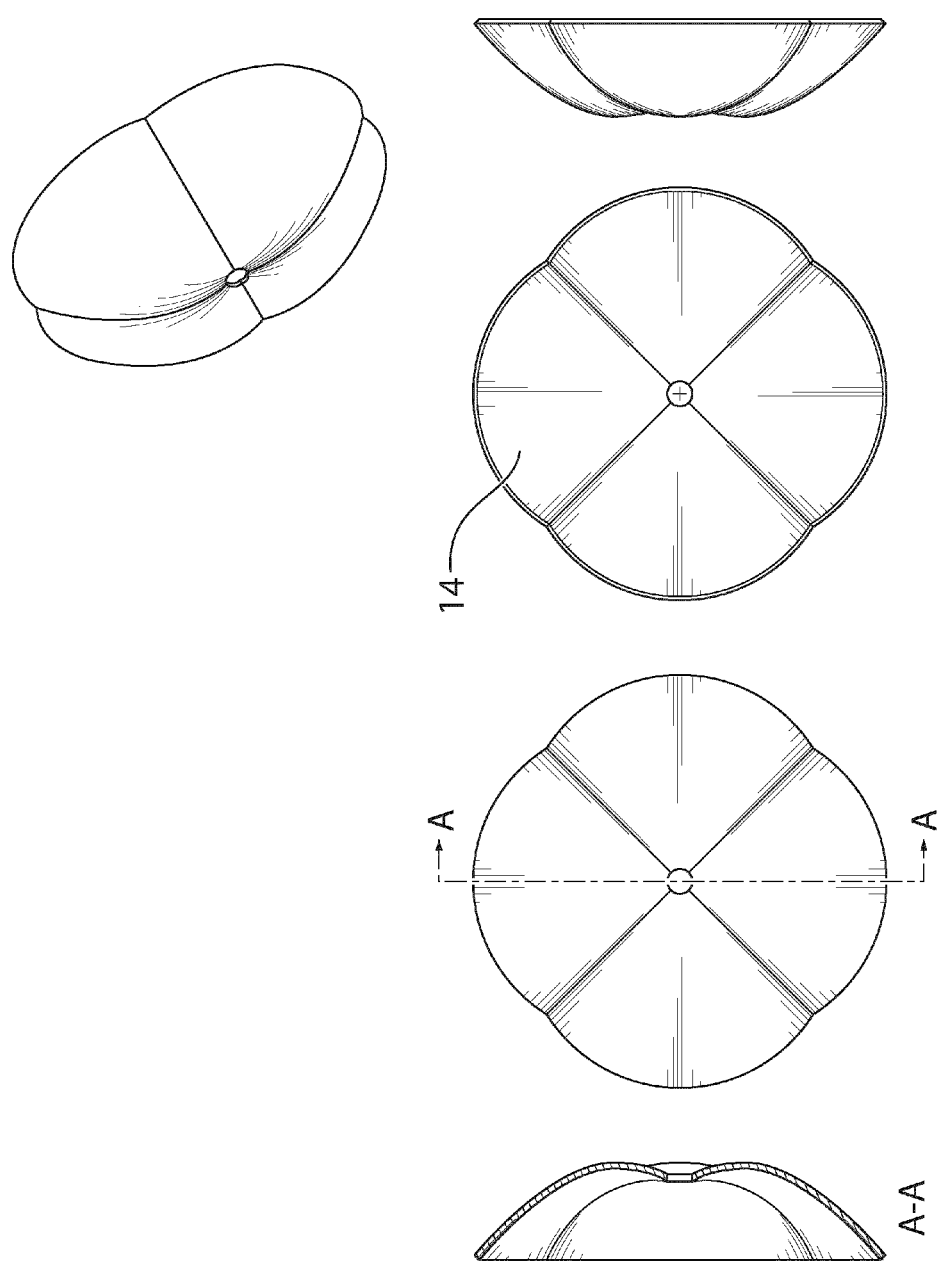
FIG. 13 depicts a secondary quad-type mirror.

FIG. 13 depicts a secondary quad-type mirror composed of four quarter-section parabolic reflectors 14.

Figure 14:
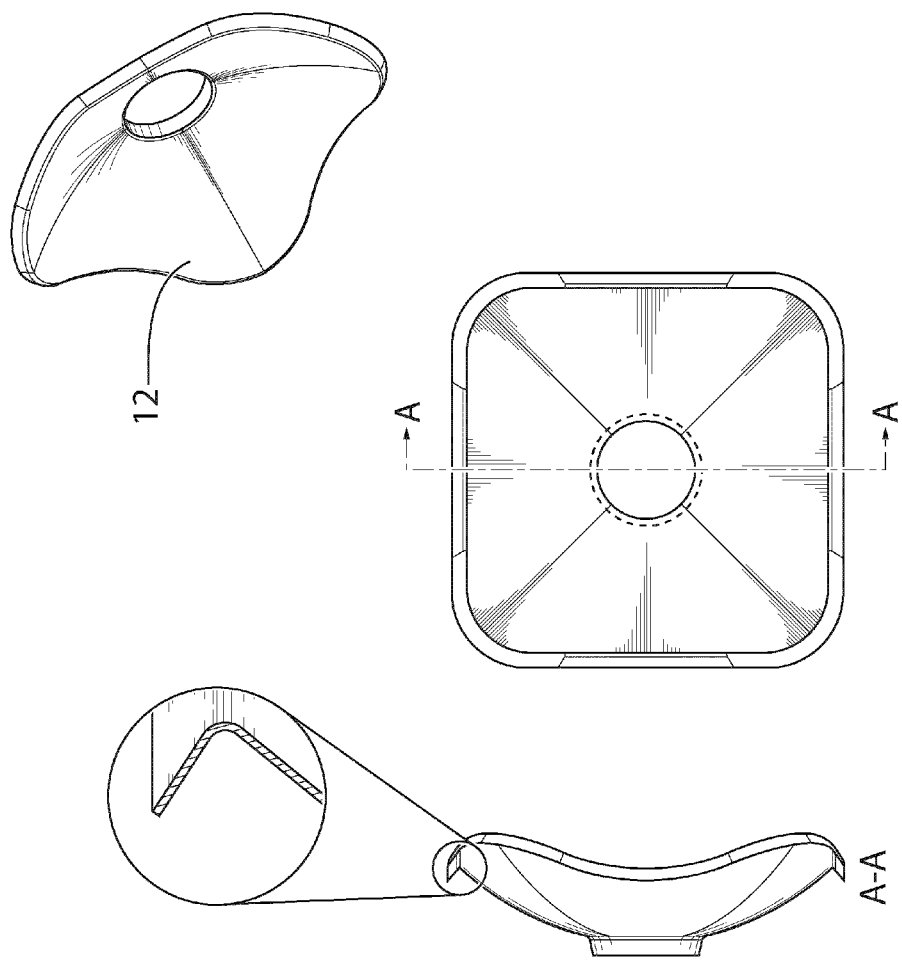
FIG. 14 depicts a primary quad-type mirror.

FIG. 14 depicts a primary quad-type mirror composed of four quarter-section parabolic reflectors 12.

Figure 15:
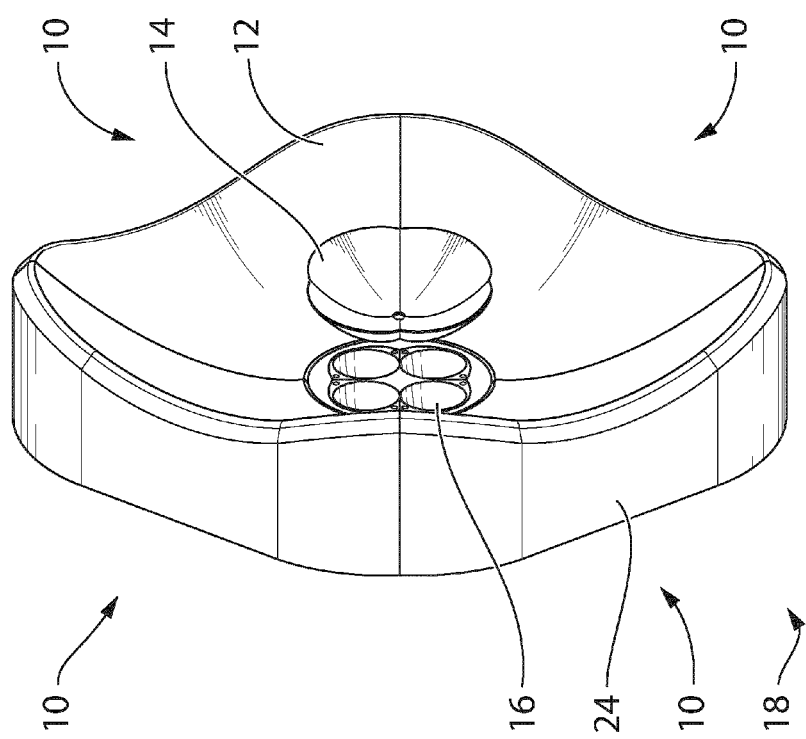
FIG. 15 is an isometric view of the quad-type lens assembly.
Figure 16:
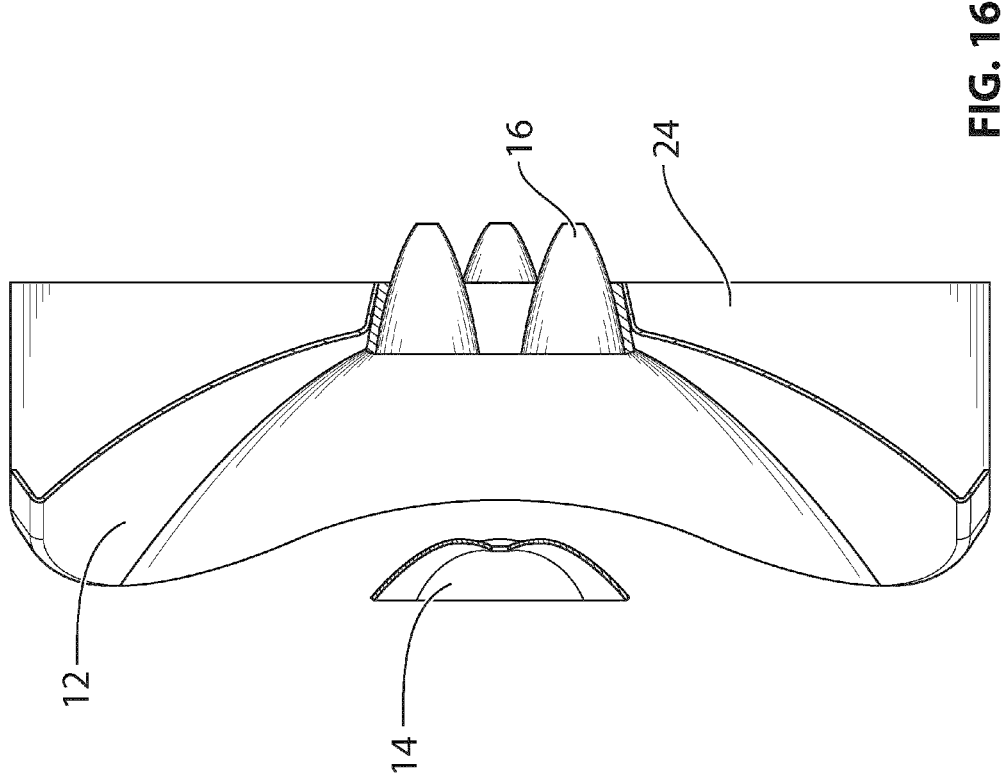
FIG. 16 is a cross-sectional view of the assembly of FIG. 15.
Figure 17:
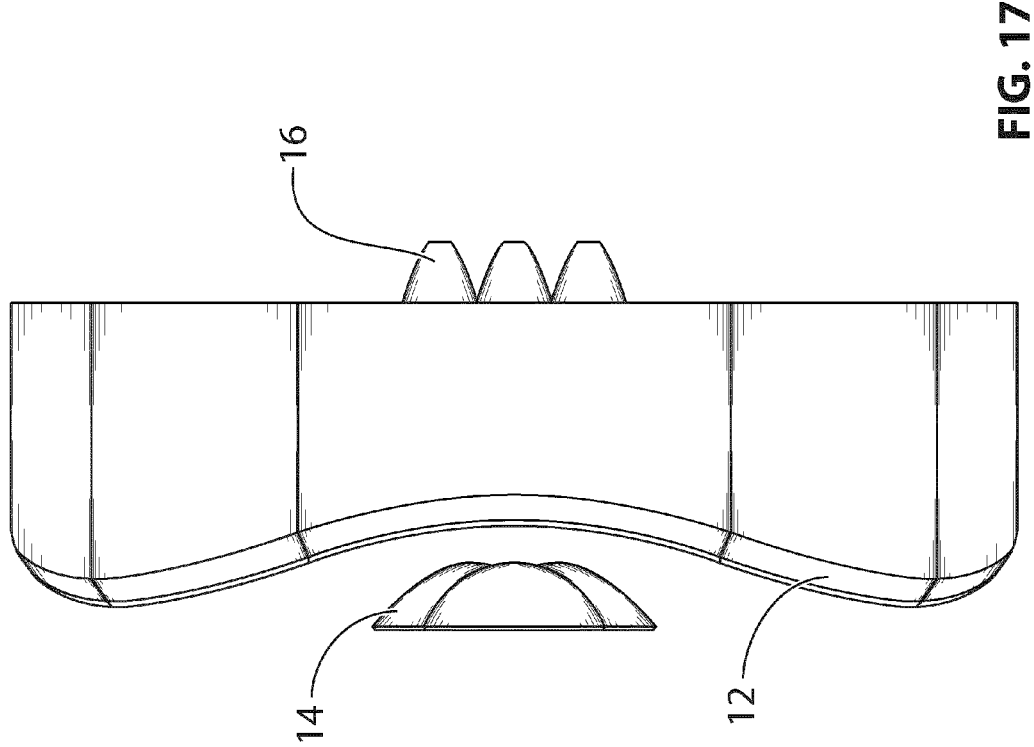
FIG. 17 is a side view of the assembly of FIG. 15.

FIG. 15 is an isometric view of the quad-type lens assembly showing the primary mirror made of four quarter-parabolic reflectors 12 and a second mirror made of four quarter-parabolic reflectors 14. The four CPC's 16 are held in a bracket or holder in the central aperture as shown. The primary mirror is supported by a base or support structure 24 that is part of the holder 18. The quad-type lens assembly is thus composed of four units 10. FIG. 16 is a cross-sectional view of the assembly of FIG. 15. FIG. 17 is a side view of the assembly of FIG. 15. For the purposes of this specification, although the disclosed embodiments refer to four quarter units packaged or grouped together in a "quad", it will be appreciated that the concept is applicable to any number of sections. In variants, a different number of sections may be packaged together to form the whole. For example, instead of four quarter units packaged together, there could be three one-third units, five one-fifth units, sixth one-sixth units, etc. A multi-unit assembly is composed of n sectional units, each sectional unit defining an angular sector of 360/n degrees where n is an integer greater than or equal to 2. In the quarter sectional embodiment, n=4 and thus each angular sector is 90 degrees. The sides of the sectional units may be substantially flat so that the sides of each unit may abut the sides of two adjacent units.

Figure 18:
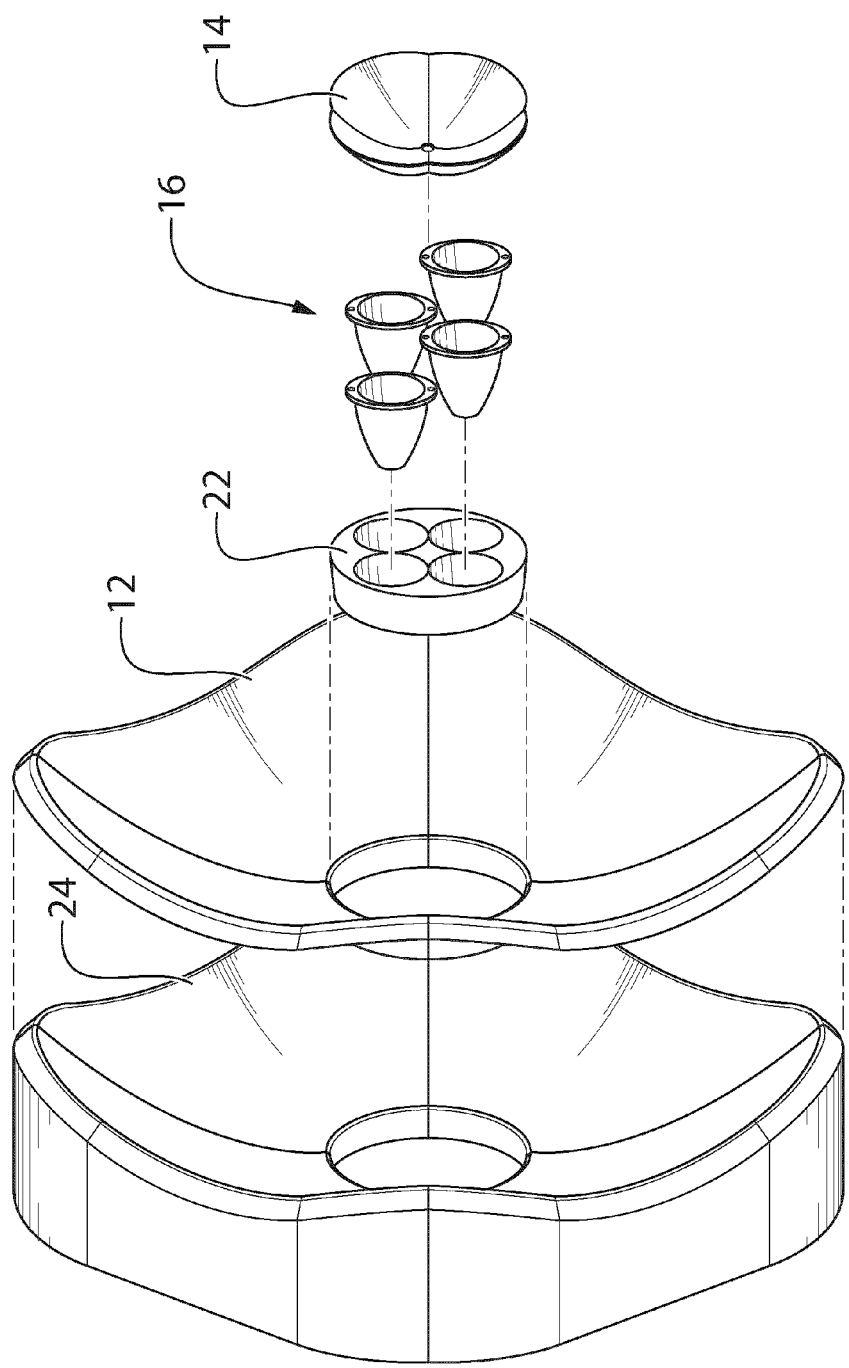
FIG. 18 is an exploded view of the assembly of FIG. 15.

FIG. 18 is an exploded view of the assembly of FIG. 15. This figure shows the primary lens (i.e. primary quad-type mirror) 12, secondary lens (i.e. secondary quad-type mirror) 14 and four CPC's 16. The primary quad-type mirror is supported in this embodiment by a pre-formed sub support heat-isolating foam or equivalent support structure. A heat-isolating support bracket 22 is provided to hold the four CPC's.

Figure 19:
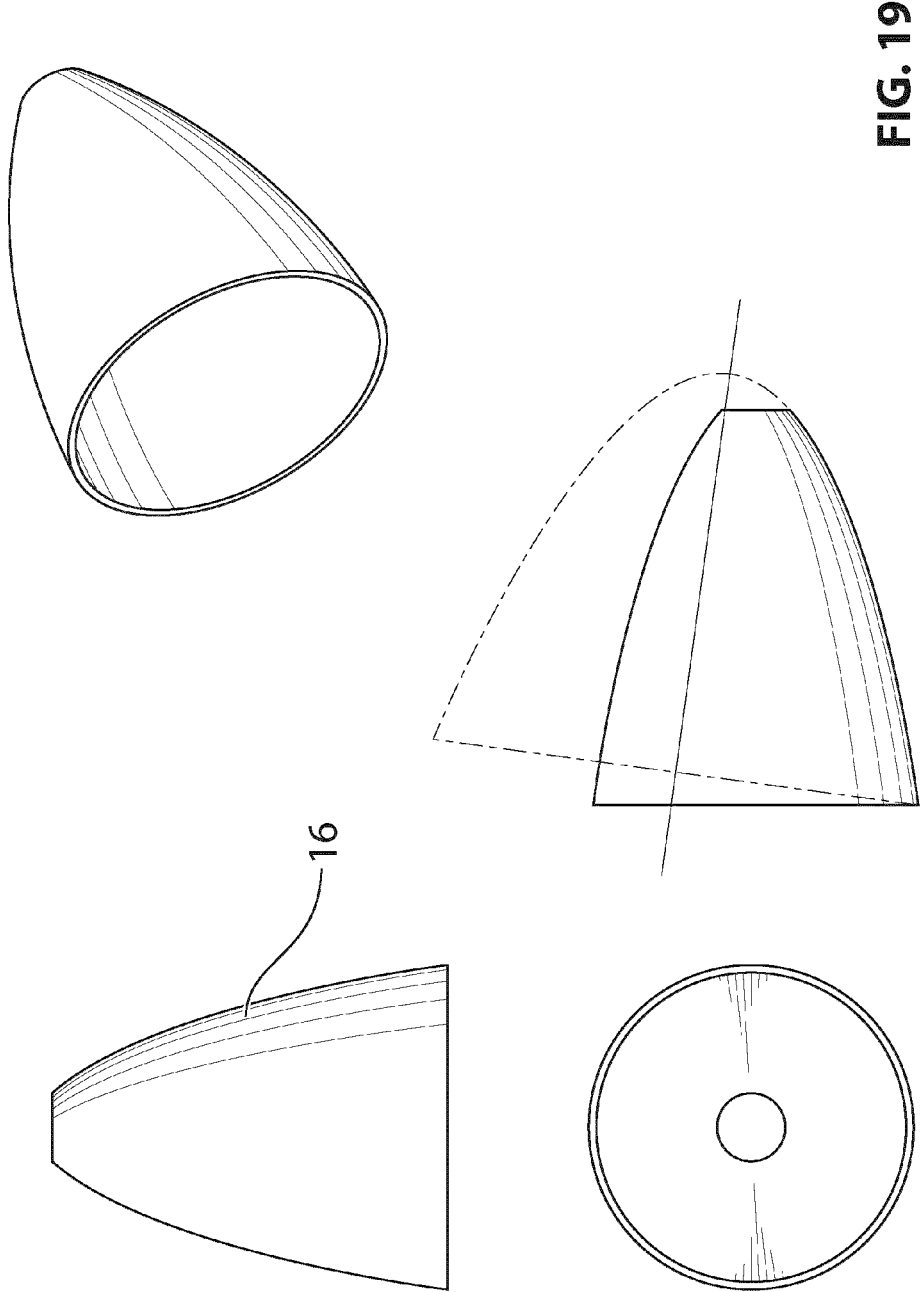
FIG. 19 depicts the CPC.
Figure 20:
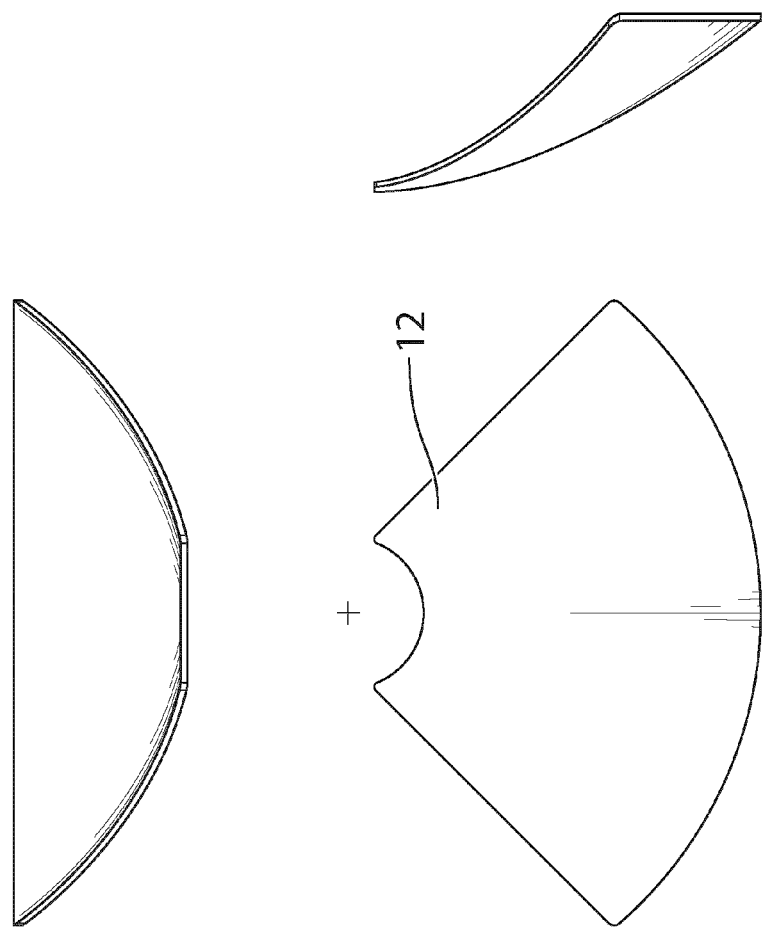
FIG. 20 depicts a quarter-section reflector for the primary quad-type mirror.
Figure 21:
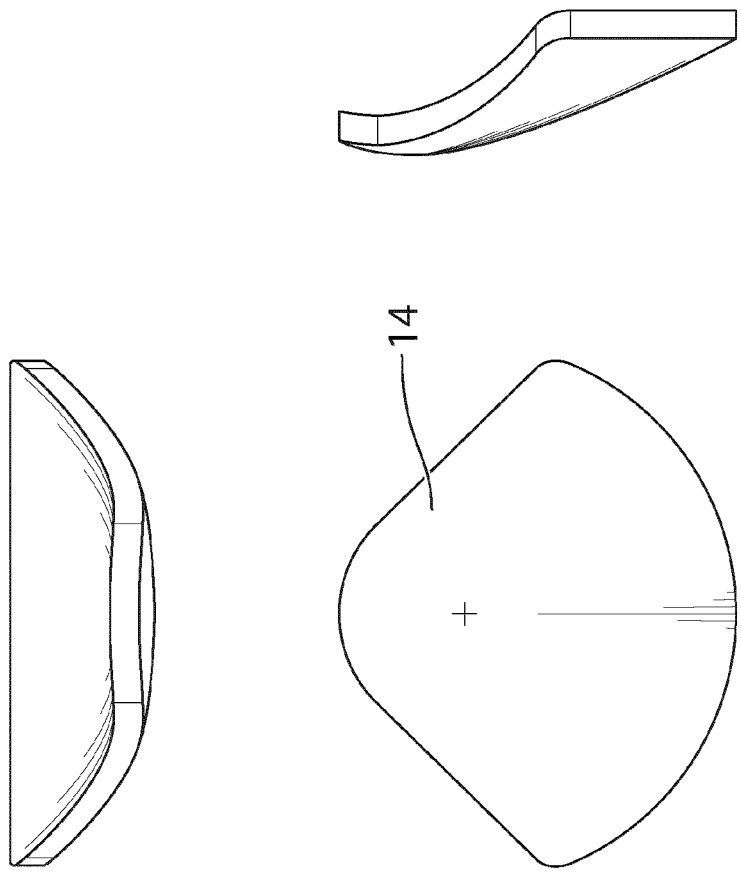
FIG. 21 depicts a quarter-section reflector for the secondary quad-type mirror.
Figure 22:
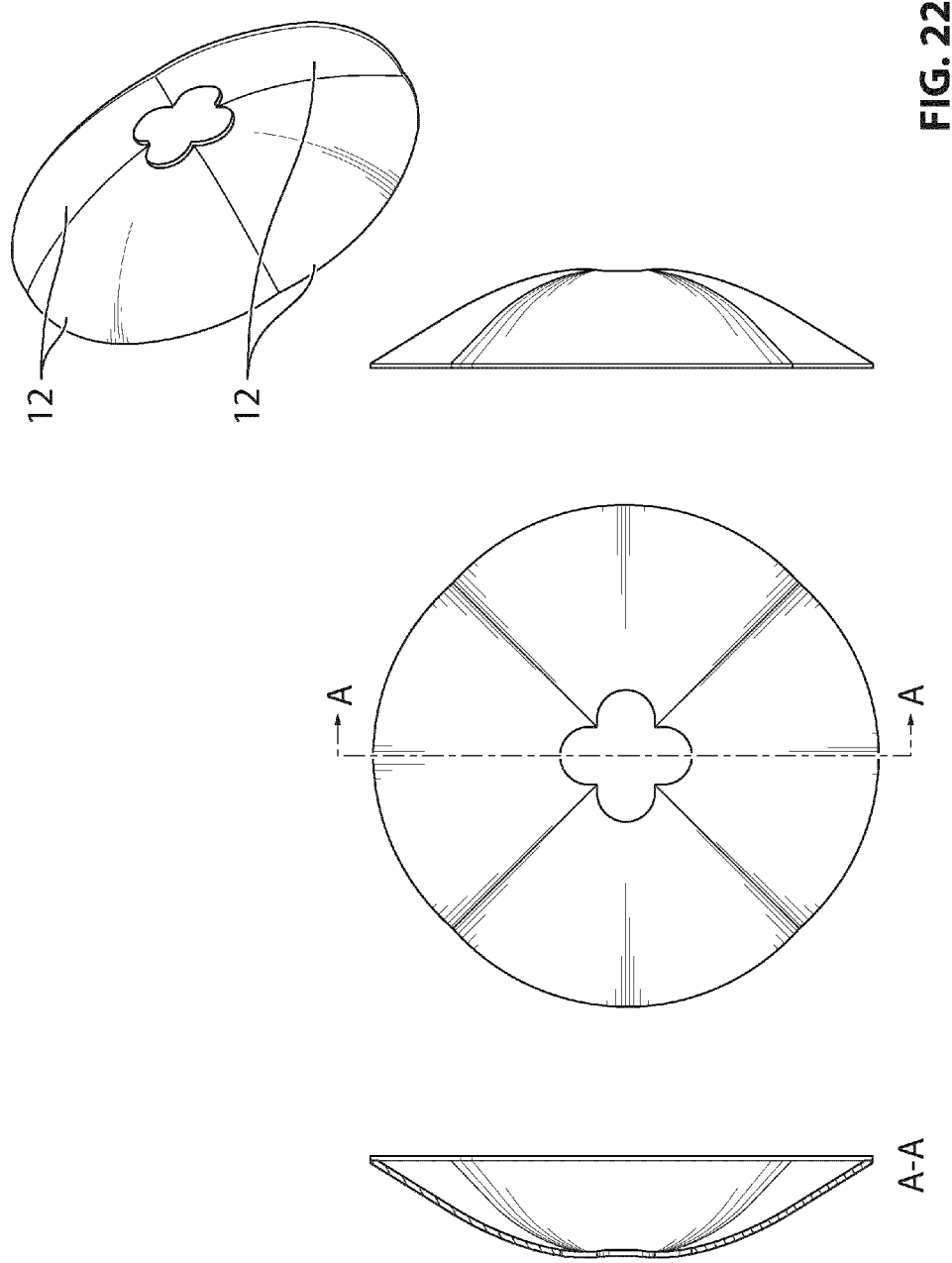
FIG. 22 depicts the primary quad-type mirror.
Figure 23:
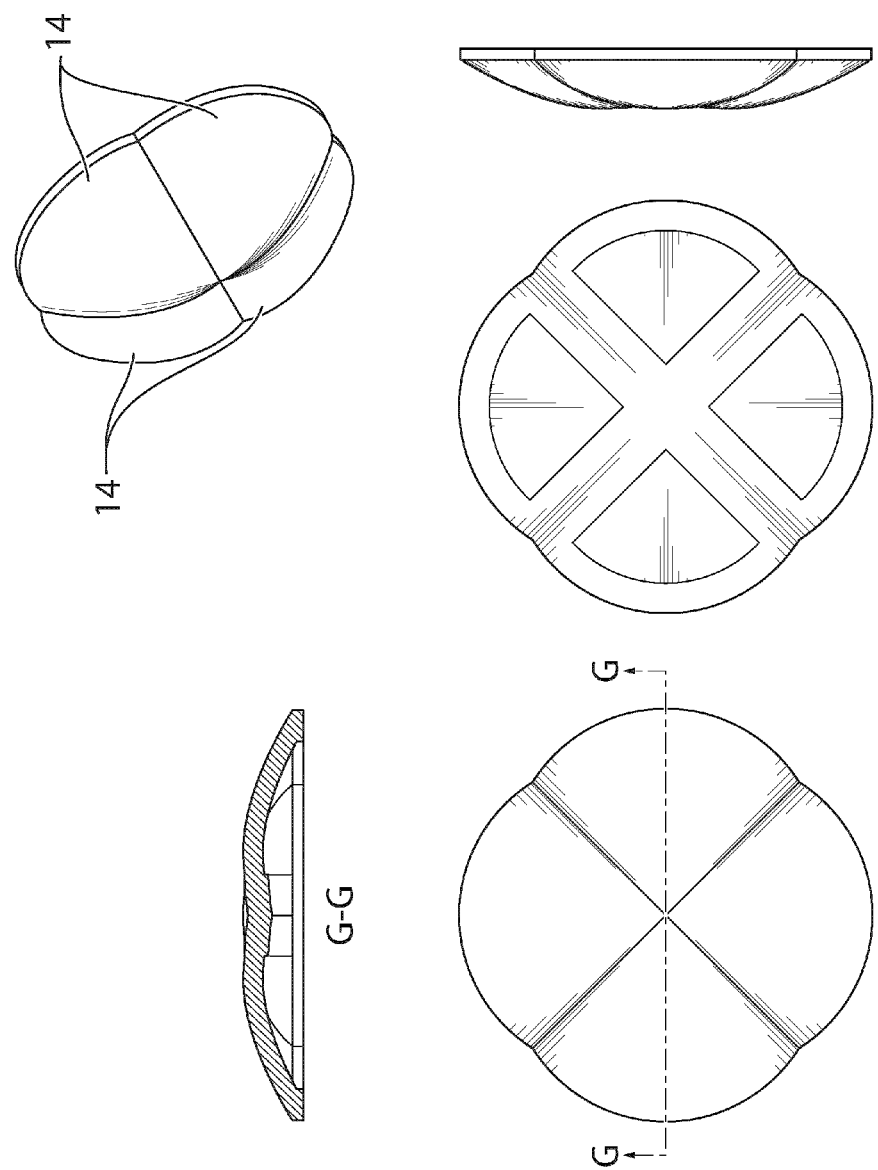
FIG. 23 depicts the secondary quad-type mirror.

The individual components are illustrated separately for greater clarity. FIG. 19 depicts the CPC 16. Also to be noted is that the CPC dimensions, in particular CPC exit apertures, can be changed to vary the desired solar concentration levels. This novel lens design also allows for non-imaging light concentration (because there is no specific focal point) which provides full control of energy output (i.e., it is possible to change the distance away from a CPV and/or change the CPC exit dimensions). FIG. 20 depicts a quarter-section reflector 12 for the primary quad-type mirror. FIG. 21 depicts a quarter-section reflector 14 for the secondary quad-type mirror. FIG. 22 depicts the primary quad-type mirror composed of four primary reflectors 12. FIG. 23 depicts the secondary quad-type mirror made up of four secondary reflectors 14.

Figure 24:
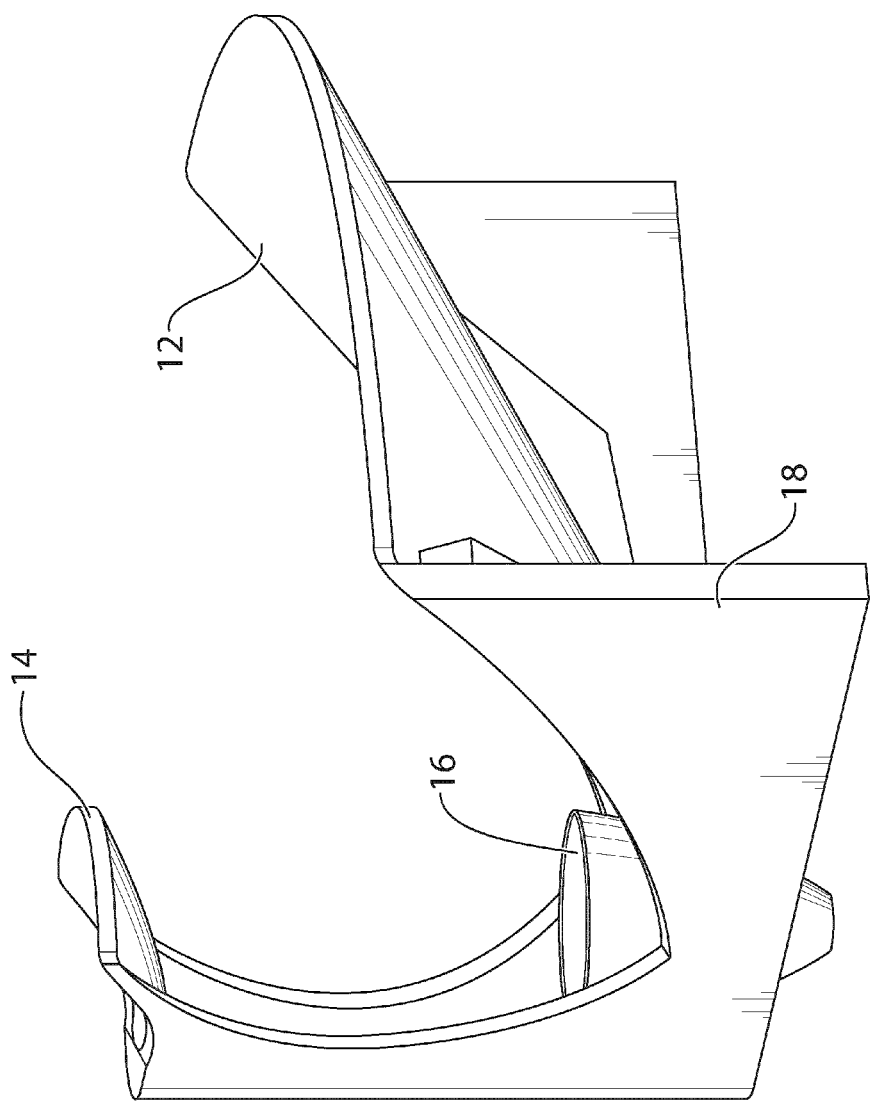
FIG. 24 is an isometric view of one quarter of a light-concentrating assembly.

FIG. 24 is an isometric view of one quarter of a light-concentrating assembly in accordance with an embodiment of the invention showing a holder 18 for holding the primary reflector 12, secondary reflector 14 and CPC 16 in the desired geometry. In the embodiment illustrated in FIG. 24, the side walls of the holder 18 are orthogonal because the units are quarter sectional units. The side walls abut those of adjacent units when the units are assembly into a multi-unit assembly. The primary reflector 12 is larger than the secondary reflector 14. The primary reflector is parabolically shaped in a concave fashion to reflect incident back upwardly toward the convexly shaped secondary reflector 14 that in turn reflects the light back down into the CPC 16. Note that in this illustrated embodiment, the vertical gap between the secondary reflector and the top of the CPC is greater than the total height (depth) of the CPC.

Figure 25:
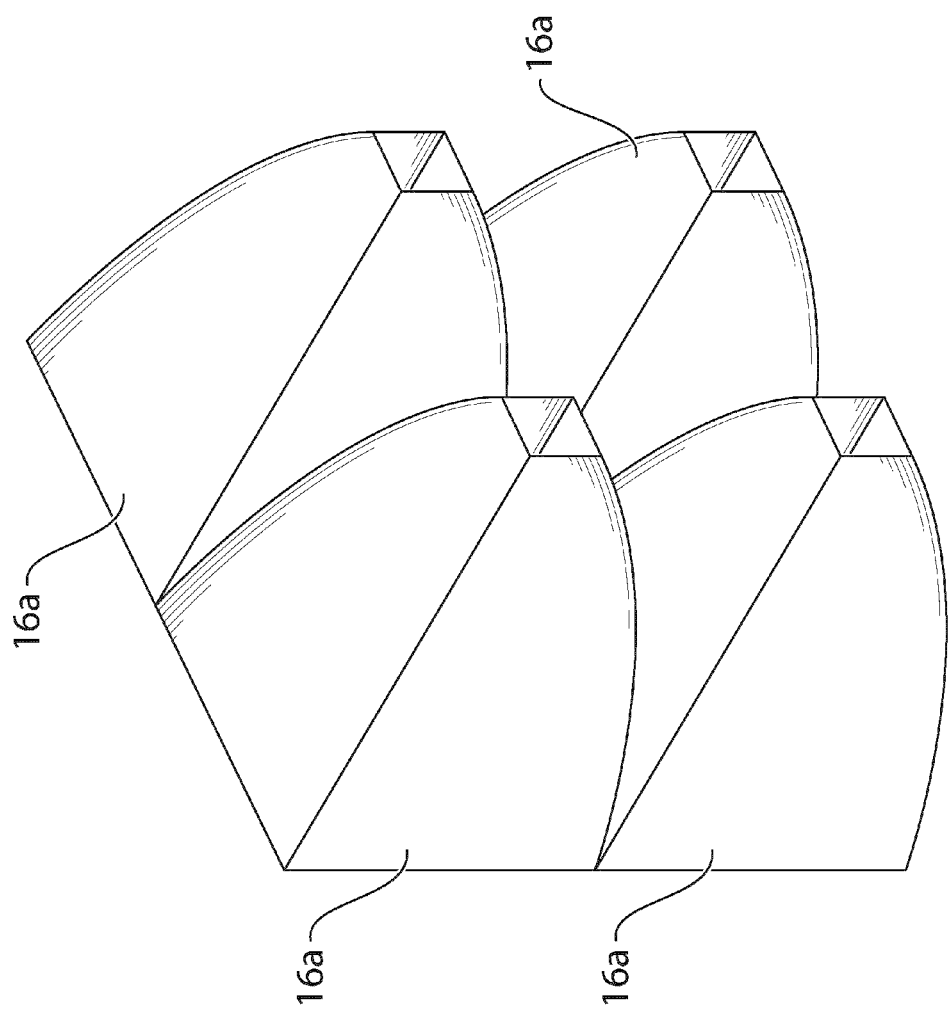
FIG. 25 is an isometric view of a square CPC for inclusion into the lens assembly in accordance with another embodiment of the present invention.

FIG. 25 depicts a square CPC 16a that may be included in the multi-unit light-concentrating assembly in accordance with another embodiment of the invention. FIG. 25 shows the front and rear apertures are square planes. The front apertures are larger than the rear ones.

In a further embodiment, the multi-unit light-concentrating lens assembly is configured such that a focal length ratio of the primary and second reflectors and that of the CPC is adjustable relative to adjust a collimation of energy entering the CPC thus enabling adjustment of tracking accuracy.

The novel lens assembly disclosed herein can, at least in some embodiments, produce differing amounts of solar energy output by varying lens dimensions (e.g. lens panel size and the quantity of lenses per panel, mirror sizing, CPC dimensions and/or distance between the CPC exit aperture and a photovoltaic cell). This lens is thus adaptable to the increasing performance capabilities of a concentrated PVC in the future. Alternatively, it can modify energy and heat output to individualize lens performance and specifications to match the requirements of any other solar recovery system and corresponding PVC limitations or specifications. It is worth reiterating that the lens is non-imaging and thus does not require a focal point, thereby allowing for margins of variance without compromising maximal performance output (unlike lenses with focal points where slight variances could decrease performance quite drastically). The space-saving configuration of this multi-unit lens assembly makes a resulting panel much lighter and smaller, thus reducing wind load and roof top load. This advantage would also allow for more units per square foot and potential for more power (BTUs) per sq ft. without creating significant added structural or mechanical stresses or loads to existing structures.

The dimensions and tolerances shown in the drawings are non-limiting and merely represent the dimensions and tolerances of one specific embodiment. Likewise, references in the drawings to focal lengths, reflectance, surface RMS, surface quality or the like are particular only to the specific embodiment illustrated and are not intended to limit the scope of the invention.

The concentrator assembly 10 may work in conjunction with a heat exchanger for dissipating some of the heat produced by the concentrated solar energy. The heat exchanger, which may be placed below assembly 10, for example below the exit aperture of the Winston cone, increases the efficiency of the concentrator assembly by keeping the temperature of the assembly within a desired temperature range. This concentrator may thus be used with a solar energy recovery system. This concentrator may be particularly useful in conjunction with a hybrid solar energy recovery system. Such a system comprises a frame, a heat exchanger plate disposed above the frame, and a dual-purpose solar energy recovery plate mounted to the frame. The dual-purpose plate has a plurality of light-concentrating lenses for concentrating incident solar radiation onto the heat exchanger plate to recover thermal energy and a plurality of photovoltaic cells for generating an electric current in response to solar radiation incident on the photovoltaic cells.

The specific dimensions of the light-concentrating lens assembly shown in the figures relate to one specific design. As will be appreciated by those skilled in optics, these dimensions may be varied to achieve different size and/or performance requirements.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

This new technology has been described in terms of specific implementations and configurations which are intended to be exemplary only. Persons of ordinary skill in the art will appreciate that many variations, refinements and modifications may be made without departing from the inventive concepts presented in this application. The scope of the exclusive right sought by the Applicant(s) is therefore intended to be limited solely by the appended claims.

The invention claimed is:

1. A light-concentrating lens assembly for a solar energy system, the assembly comprising:
   a primary off-axis quarter-section parabolic reflector for reflecting incident light;
   a secondary off-axis quarter-section parabolic reflector for receiving light reflected from the primary off-axis quarter-section parabolic reflector;
   a compound paraboloid concentrator (CPC) for receiving light reflected from the secondary off-axis quarter-section parabolic reflector; and
   a housing for holding the primary and secondary off-axis parabolic reflectors as well as the CPC.

2. The light-concentrating lens assembly as claimed in claim 1 wherein the primary off-axis quarter-section parabolic reflector is larger than the secondary off-axis quarter-section parabolic reflector.

3. A multi-unit light-concentrating lens assembly for a solar energy system, the assembly comprising:
   for each unit of a plurality of units packaged together:
   a primary off-axis quarter-section parabolic reflector for reflecting incident light;
   a secondary off-axis quarter-section parabolic reflector for receiving light reflected from the primary off-axis quarter-section parabolic reflector;

a compound paraboloid concentrator (CPC) for receiving light reflected from the secondary off-axis quarter-section parabolic reflector; and a housing for holding the primary and secondary off-axis parabolic reflectors as well as the CPC, wherein four units are packaged together such that the primary and secondary off-axis quarter-section parabolic reflectors of each unit abut the primary and secondary off-axis quarter-section parabolic reflectors of two adjacent units.

4. The multi-unit light-concentrating lens assembly as claimed in claim 3 comprising a primary mirror defining four off-axis quarter-section parabolic reflectors.

5. The multi-unit light-concentrating lens assembly as claimed in claim 4 comprising a secondary mirror defining four off-axis quarter-section parabolic reflectors.

6. The multi-unit light-concentrating lens assembly as claimed in claim 5 comprising a heat-isolating foam support for supporting the primary mirror.

7. The multi-unit light-concentrating lens assembly as claimed in claim 6 comprising a hole in the foam support and a hole in the primary mirror.

8. The multi-unit light-concentrating lens assembly as claimed in claim 7 comprising a CPC mounting holder aligned with the hole in the primary mirror for holding four compound paraboloid concentrators.

9. The multi-unit light-concentrating lens assembly as claimed in claim 8 wherein the CPC mounting holder is mounted to the primary mirror.

10. The multi-unit light-concentrating lens assembly as claimed in claim 9 wherein the primary mirror has a focal length greater than that of the second mirror.

11. The multi-unit light-concentrating lens assembly as claimed in claim 5 wherein the primary mirror has a focal length greater than that of the second mirror.

12. The multi-unit light-concentrating lens assembly as claimed in claim 3 wherein a focal length ratio of the primary and second reflectors and that of the CPC is adjustable to adjust a collimation of energy entering the CPC thus enabling adjustment of tracking accuracy.

13. A multi-unit light-concentrating lens assembly for a solar energy system, the assembly comprising:

a plurality of units packaged together to form the assembly, wherein each unit comprises:

a primary off-axis sectional parabolic reflector for reflecting incident light defining an angle of 360°/n where $n \geq 2$ and represents a number of sections that constitute each unit;

a secondary off-axis sectional parabolic reflector for receiving light reflected from the primary off-axis sectional parabolic reflector;

a compound paraboloid concentrator (CPC) for receiving light reflected from the secondary off-axis sectional parabolic reflector; and a housing for holding the primary and secondary off-axis parabolic reflectors as well as the CPC, wherein the units are packaged together such that the primary and secondary off-axis sectional parabolic reflectors of each unit abut the primary and secondary off-axis sectional parabolic reflectors of two adjacent units.

14. The multi-unit light-concentrating lens assembly as claimed in claim 13 wherein n=4.

15. The multi-unit light-concentrating lens assembly as claimed in claim 14 comprising a primary mirror defining four off-axis quarter-section parabolic reflectors.

16. The multi-unit light-concentrating lens assembly as claimed in claim 15 comprising a secondary mirror defining four off-axis quarter-section parabolic reflectors.

17. The multi-unit light-concentrating lens assembly as claimed in claim 16 comprising a heat-isolating foam support for supporting the primary mirror.

18. The multi-unit light-concentrating lens assembly as claimed in claim 17 comprising a hole in the foam support and a hole in the primary mirror.

19. The multi-unit light-concentrating lens assembly as claimed in claim 18 comprising a CPC mounting holder aligned with the hole in the primary mirror for holding four compound paraboloid concentrators.

20. The multi-unit light-concentrating lens assembly as claimed in claim 19 wherein the CPC mounting holder is mounted to the primary mirror.

* * * * *